Oct. 6, 1942.    R. A. BRUNER    2,297,741
BATTERY COVER MOLD
Filed Sept. 21, 1936    6 Sheets-Sheet 1

Inventor
Ray A. Bruner
by Spencer Harding and Fisher
His Attorneys

Oct. 6, 1942.   R. A. BRUNER   2,297,741
BATTERY COVER MOLD
Filed Sept. 21, 1936   6 Sheets-Sheet 3
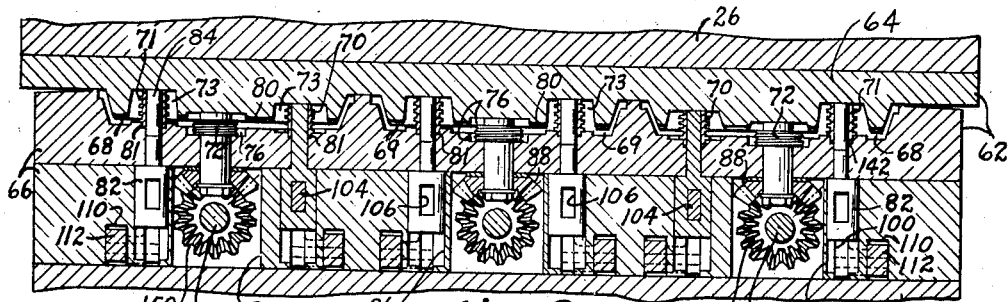
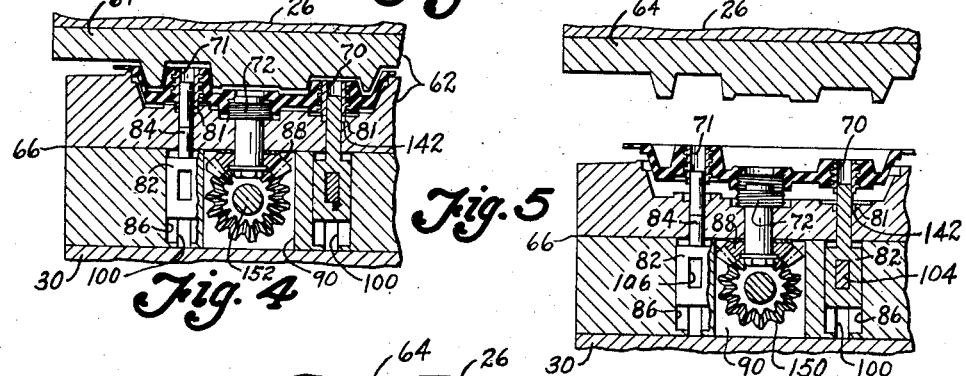
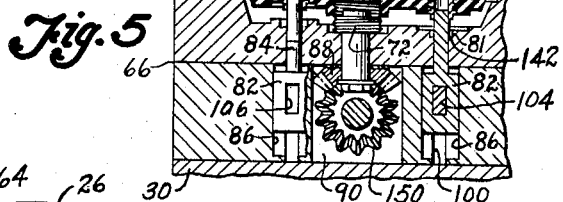
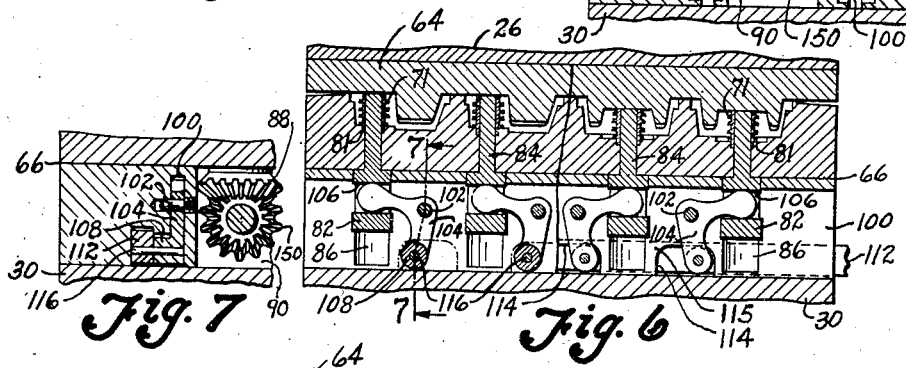
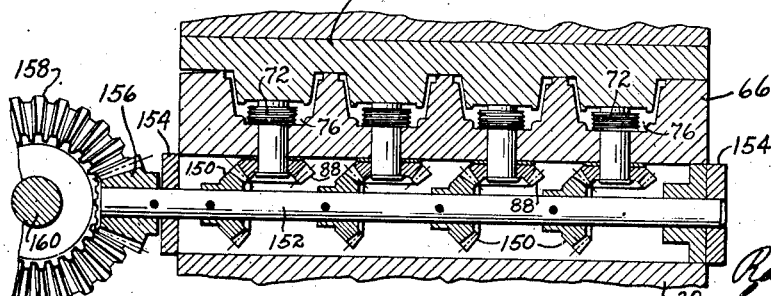
Inventor
Ray A. Bruner
by
Spencer
Hardman
and Fehr
his Attorneys

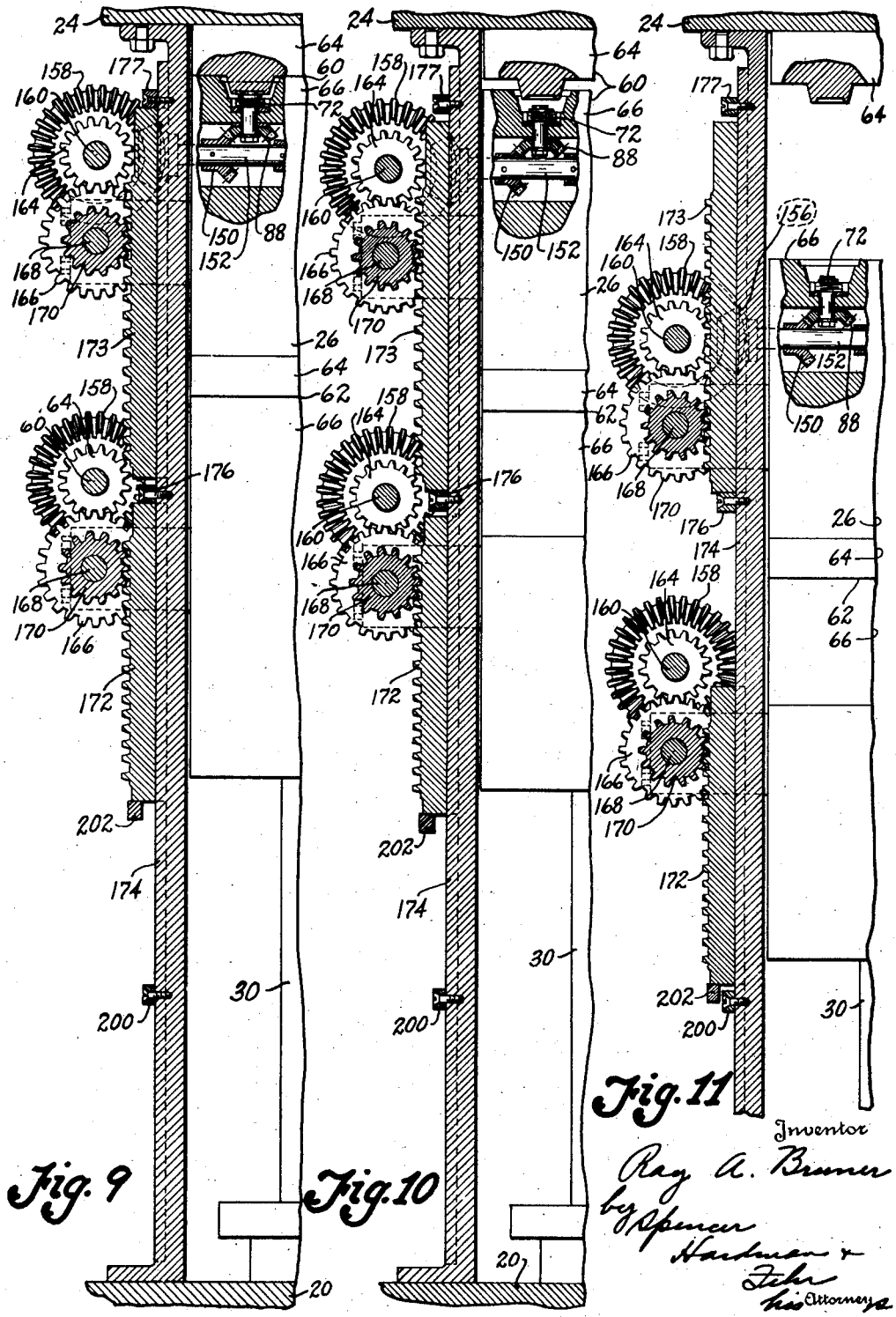

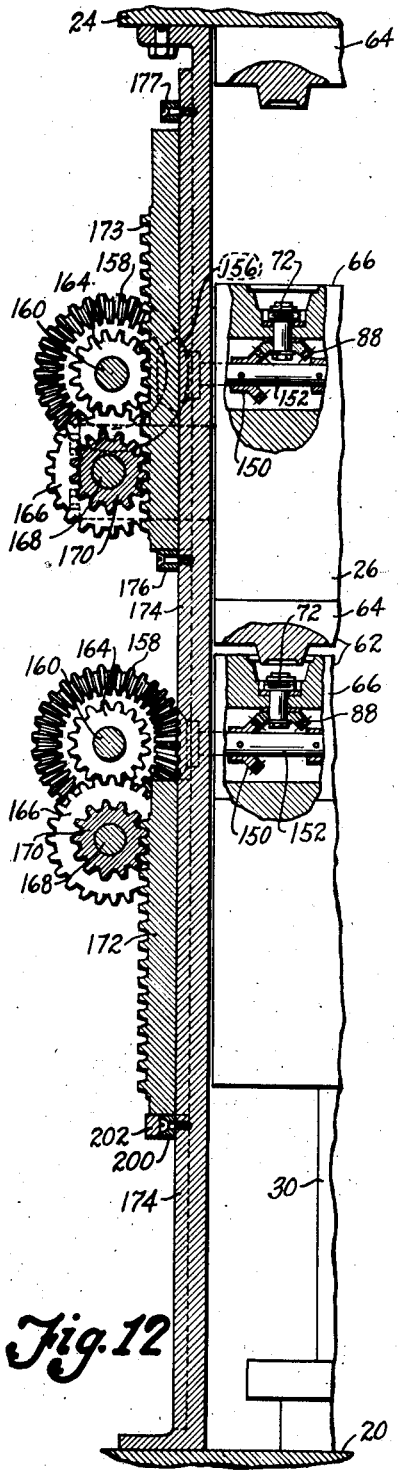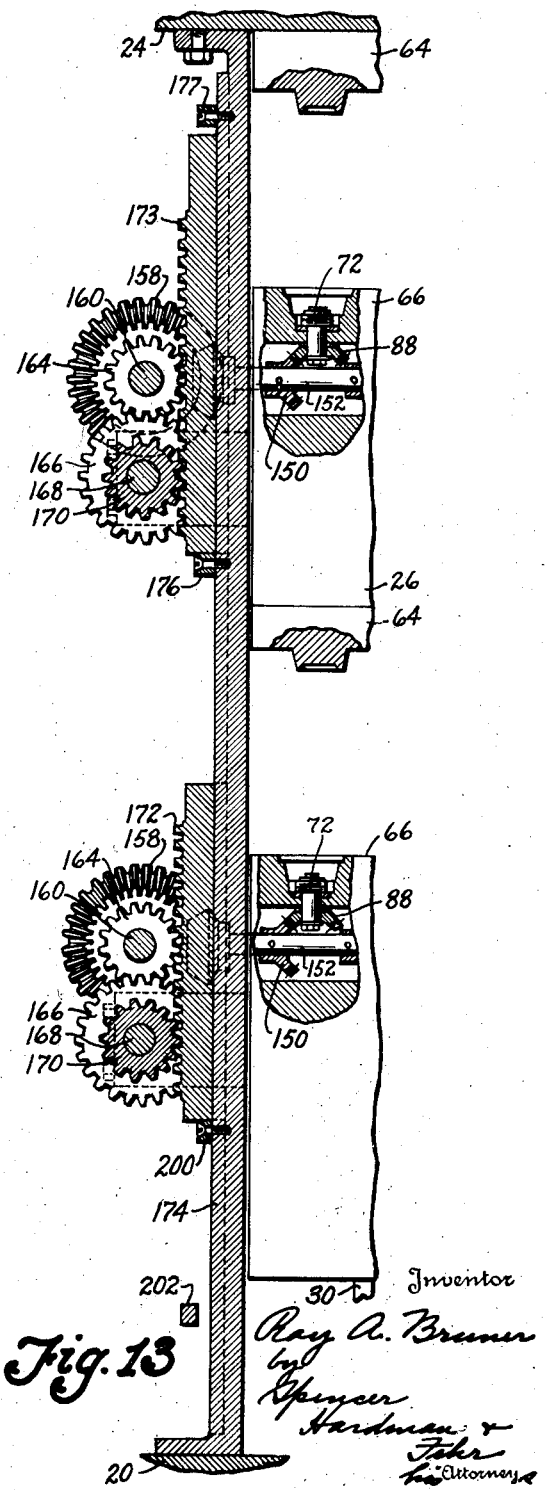
Fig. 12
Fig. 13

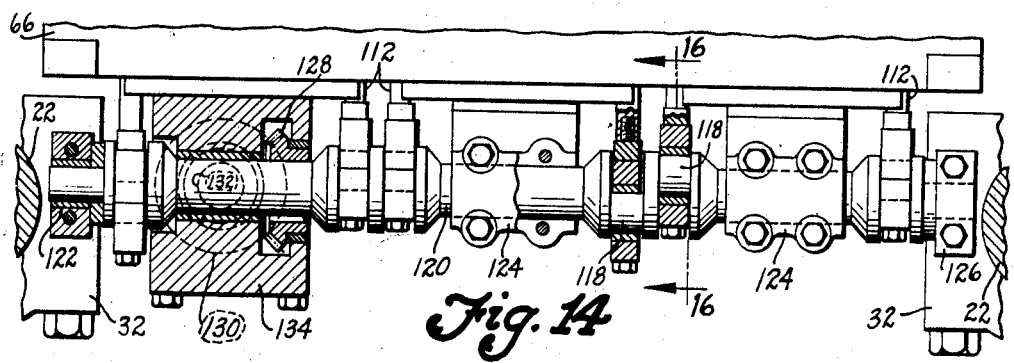
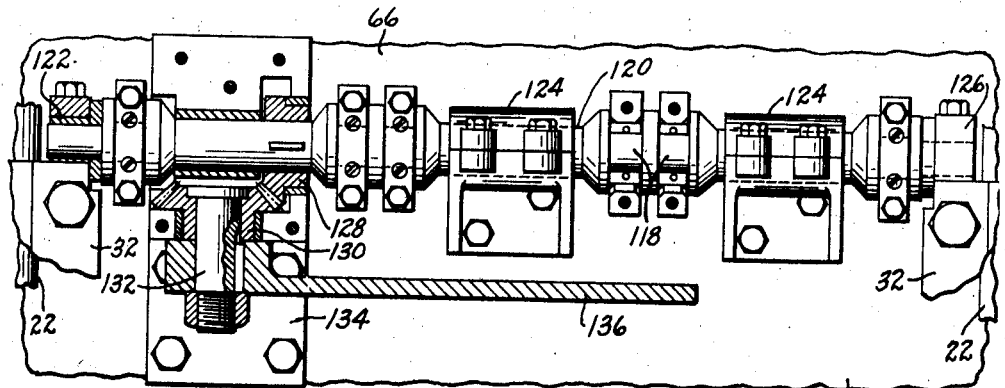
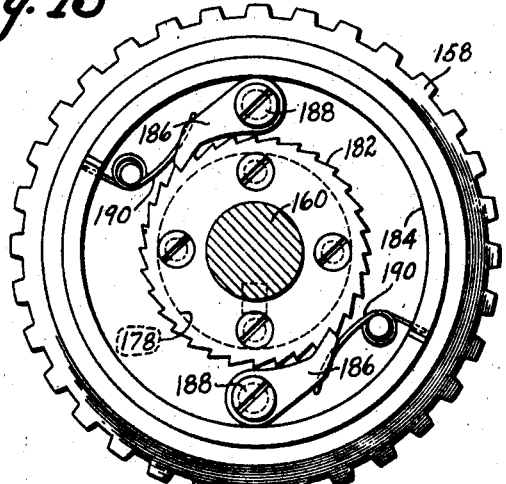

Patented Oct. 6, 1942

2,297,741

UNITED STATES PATENT OFFICE 2,297,741

BATTERY COVER MOLD

Ray A. Bruner, Muncie, Ind., assignor to General Motors Corporation, Detroit, Mich., a corporation of Delaware Application September 21, 1936, Serial No. 101,704

23 Claims. (Cl. 18—16)

This invention relates to molding presses and more particularly to a press for molding articles having a threaded portion, such as covers for storage batteries.

It is the present day practice in molding battery covers to place the core, which forms the conventional threaded filler hole of a cover, into the cavity of the cover mold in such manner that the core remains in threaded engagement with the cover and is removed together with the latter from the mold, or the core is unscrewed from the cover and withdrawn from the mold cavity prior to the ejectment of the cover therefrom. Either practice slows down production and, hence, increases the cost of making battery covers.

It is the primary aim and object of the present invention to provide a molding press for battery covers in which the threaded core is permanently mounted in the mold and is unscrewed from a molded cover in response to the opening of the mold.

It is another object of the present invention to make provision in the molding press for ejecting a cover from the mold while the core is unscrewed from said cover.

These and other objects are accomplished by rotatably mounting an axially immovable, threaded core in one of a pair of cooperating molds, and by providing mechanism responsive to the opening of the molds for rotating the core to unscrew it from a molded cover. A manually operable device is further provided for ejecting a cover from the mold at substantially the rate with which the cover and core separate when the latter is unscrewed from the cover, thus preventing the core from functioning as an ejector which would strip the molded thread and cause the cover to become buckled.

Further objects and advantages of the present invention will be apparent from the following description, reference being had to the accompanying drawings wherein a preferred embodiment of the present invention is clearly shown.

In the drawings:

Fig. 3 is a fragmentary section taken on the line 3—3 of Fig. 2.

Figs. 4 and 5 are fragmentary sections similar to Fig. 3, showing certain elements in different positions of operation, however.

Fig. 6 is a fragmentary section taken on the line 6—6 of Fig. 2.

Fig. 7 is a fragmentary section taken on the line 7—7 of Fig. 6.

Fig. 8 is a fragmentary section taken on the line 8—8 of Fig. 2.

Figs. 9 to 13 inclusive, are fragmentary sections of a certain operating mechanism of the press in different positions of operation. More particularly, Fig. 13 is an enlarged fragmentary section taken on the line 13—13 of Fig. 1.

Fig. 14 is a fragmentary section and part plan view of certain mechanism of the press.

Figure 2:
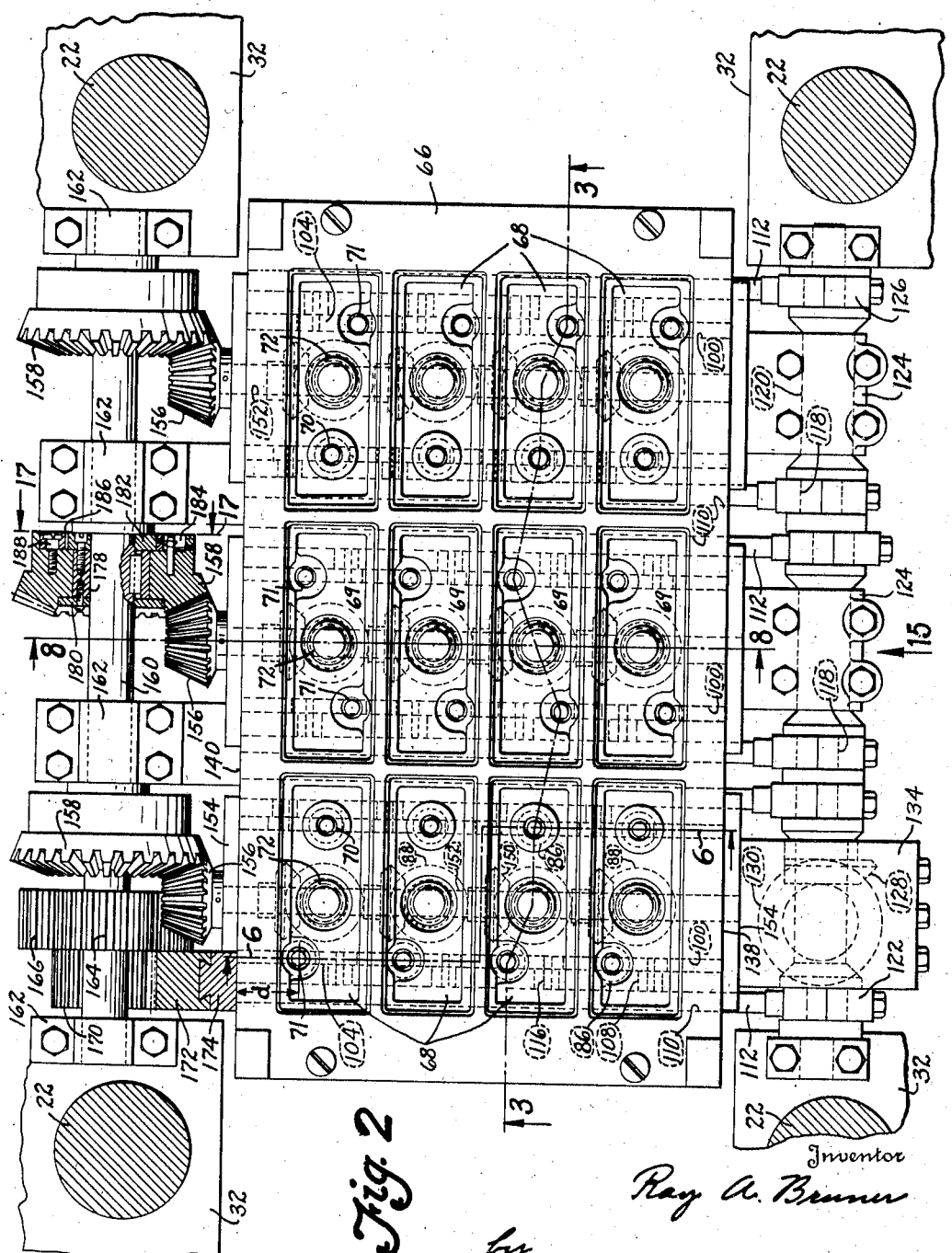
Fig. 2 is an enlarged section taken on the line 2—2 of Fig. 1.

Fig. 15 is a fragmentary, partly sectioned elevation of the mechanism illustrated in Fig. 14, and is viewed in the direction of arrow 15 in Fig. 2.

Fig. 16 is an enlarged fragmentary section taken on the line 16—16 of Fig. 14.

Fig. 17 is an enlarged section of a detail, and is taken on the line 17—17 of Fig. 2.

Figure 1:
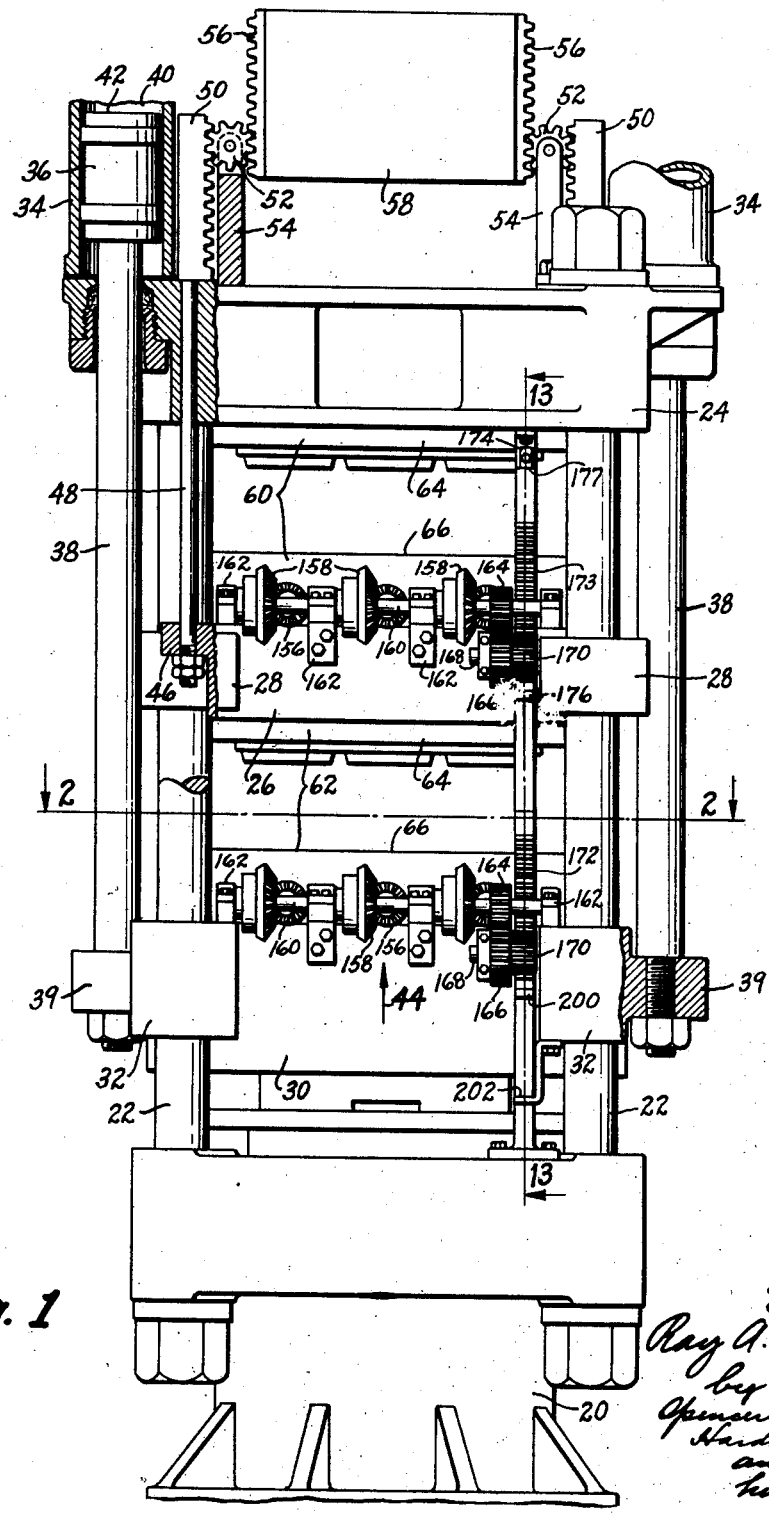
Fig. 1 is a front elevation of a molding press embodying the present invention.

Referring to the drawings and more particularly to Fig. 1, the instant press comprises a main cylinder 20 which forms the base for the entire structure of the press. Projecting vertically from this base are parallel posts 22, preferably four, on which a head 24 is mounted. Movable vertically between base 20 and head 24 is a carrier 26, having lugs 28 which are guided by the posts 22 (see Fig. 2). A ram 30 cooperates with the main cylinder or base 20 and is provided with lugs 32 which are also guided by the posts 22 for vertical movement. Mounted on top of the head 24 are two opposite cylinders 34, receiving plungers 36, the rods 38 of which are secured to opposite lugs 39 of the ram 30. One end 40 of each cylinder 34 is in permanent communication with any suitable supply of fluid under substantially constant pressure, wherefore the plungers 36 normally urge the ram 30 into the lowermost position shown in Fig. 1. The main cylinder 20 may either be connected with any suitable supply of fluid pressure, or vented, by a manually operated valve of any suitable make (not shown). Since the end face of the ram 30 which is exposed to the fluid pressure in the main cylinder 20 has a greater area than the fluid exposed end faces 42 of both plungers 36 and the pressure of the fluid supply for the main cylinder 20 is higher than the pressure of the fluid for the cylinders 34, it can be readily understood that admission of fluid pressure into the main cylinder 20 results in movement of the ram 30 in the direction of arrow 44 in Fig. 1 against the tendency of the plungers 36 to force the ram into the illustrated lowermost position. The carrier 26 is provided with two opposite lugs 46 to each of which a rod 48 is attached. These rods 48 are guided through the head 24 and provided with racks 50 which are in permanent mesh with gears 52, mounted in suitable bearing brackets 54 on top of the head 24. Also meshing with the gears 52 are opposite racks 56 of a counterweight 58. The lowermost position of the carrier 26 is determined by the racks 50 when resting on the head 24 as shown in Fig. 1.

The illustrated press has two pairs 60 and 62 of cooperating molds 64, 66 each. Both pairs of molds are exactly identical, the upper molds 64 of each pair being mounted on the head 24 and the lower side of the carrier 26, respectively, while the lower mold 66 of each pair is mounted on the upper side of the carrier 26 and the ram 30, respectively. The shape of the mold cavities is best illustrated in Figs. 2 and 3 wherein it will be noticed that a pair of cooperating molds comprises two different sets of cavities 68 and 69 for two slightly different battery covers. The vertical outer rows of cavities 68 in Fig. 2 serve for the molding of end covers through which the battery terminals extend. More particularly, the battery terminals are to extend through acid-resisting lead bushings 70 which are molded right in the covers as will be more fully described hereafter. It will also be noticed from Fig. 2 that the terminal receiving bushings 70 are located on the longitudinal center axis of the cover cavities 68 while the remaining bushings 71, to be also molded in the covers, are located eccentrically of said axis. These latter bushings 71 are to receive the posts of conventional plate straps which serve for interconnection of the various cells of storage batteries through suitable connectors. Each one of the covers molded in the instant press is furthermore provided with a filler hole which is normally sealed by a threaded plug. The core which forms the threaded filler hole of each cover is indicated by the reference numeral 72. The mold illustrated in Fig. 2 is typical for molding covers for storage batteries having three cells. It appears from Fig. 3 that the terminal bushings 70 are located at a level different from that of the remaining bushings 71. Each bushing 70 and 71 is embedded in a boss which is formed by recessed portions 73 of each cover cavity 68 and 69, and the threaded filler hole of each cover is provided in a boss which is formed by the recessed portion 76 of each cover cavity. The cover cavities 68, 69 are further provided with suitable recesses 80 to form ribs between the bosses of each cover.

The bushings 70 and 71 are located in annular recesses 81 of each cover cavity 68, 69. These recesses are partly formed by reciprocable plungers 82, the stems 84 of which may be moved into and out of the bushings. The plungers 82 are received in annular recesses 86 of the lower molds 66. Manually operable means for simultaneously reciprocating the plungers 82 of a lower mold 66 into and out of the bushings 70 and 71 will be described later. It may be stated in advance that the stems 84 of the plungers 82 serve not only to reenforce the bushings against collapse under the molding pressure, but also to assist in ejecting the molded covers from the mold cavities. The threaded cores 72 are rotatably mounted in the lower molds 66 and carry bevel gears 88 which project into parallel grooves 90 of said lower molds.

Before starting an operation of the press, the operator inserts bushings 70 and 71 into the recesses 81 of both lower, uncharged molds 66 while the press is in the open position shown in Fig. 1. In so doing, the operator manipulates all plungers 82 of each lower mold 66 into the uppermost position shown in Fig. 3, so that the stems 84 project completely into the inserted bushings. Since these bushings fit rather tightly over the stems 84, the operator usually hammers the bushings substantially into the position shown in Fig. 3. The operator next closes the molds by manipulating the earlier described valve to admit fluid pressure to the main cylinder 20. The lower pair 62 of molds will first close during the ascent of the ram, while the upper pair 60 of molds will close upon continued ascent of the lower pair 62 of closed molds. The closing molds will force such bushings in place which have not been completely positioned by the operator. The molds are then reopened upon manipulation of the previously mentioned control valve into position to vent the main cylinder 20, and the operator deposits a strip of uncured rubber or other molding material in each cavity 68, 69 of the lower molds 66. The molds, after having been thus charged, are again closed and remain closed until the molded covers are vulcanized, the necessary heat being furnished from steam jackets (not shown) in all molds. After a predetermined lapse of time the operator opens the molds for removal of the molded covers. During such opening of the molds, the covers are gradually ejected from the lower molds 66 as the threaded cores 72 are unscrewed from the filler holes of the covers in a manner to be described hereafter. The counter-weight 58, while designed to relieve the ram 30 from lifting the full weight of the carrier 26, is of less weight than said carrier so as not to interfere with the opening of the upper pair 60 of molds 64, 66 under the gravity of the carrier 26 when the ram 30 descends towards its lowermost position in Fig. 1. Suitable guides (not shown) prevent lateral escape of the counter-weight 58 from between the gears 52.

Referring more particularly to Figs. 2 to 7 inclusive, and 14 to 16 inclusive, the lower mold 66 of each pair of molds is provided with grooves 100 which extend parallel to the earlier mentioned grooves 90 and pass centrally through the vertically aligned recesses 86 as viewed in Fig. 2. Pivotally mounted at 102 in these grooves 100 are bell-crank levers 104, one for each plunger 82. One end of each lever 104 is roller-shaped and fits into a slot 106 of a plunger 82, while the other end of each lever 104 is provided with a boss 108 (see Fig. 7). The lower mold 66 of each pair of molds is provided with another series of grooves 110 which extend parallel to the earlier described grooves 90 and 100. Movable in the grooves 110 are bars 112 which are abutted by the bosses 108 of the levers 104 in the manner disclosed in Fig. 7. These bosses 108 extend through suitable recesses 114 in the partition 115 between adjacent grooves 100 and 110. A pin 116 connects each lever 104 to a bar 112. As more particularly shown in Fig. 14, each of the bars 112 of a pair of molds is connected to a crank arm 118 of a crank shaft 120 which is mounted in suitable bearings 122, 124 and 126 on the lower mold of said pair. Mounted on the crank shaft 120 intermediate two crank arms thereof is a bevel gear segment 128 which is in permanent mesh with a similar segment 130, keyed to a stub shaft 132 which is rotatably mounted in a bearing bracket 134 on said lower mold 66, and more particularly at the rear of the press as illustrated in Fig. 1. Also secured to the stub shaft 132 is a rocker arm 136 (see Fig. 15) which may be manipulated by the operator to cause reciprocation of the plungers 82 through intermediation of the bevel gears 130 and 128, crankshaft 120, bars 112, pins 116 and levers 104, as can be readily understood. Since the various bushings 70—71 are alternately differently spaced from the adjacent end faces 138 and 140 of the lower mold 66 as appears from Fig. 2, the shortest distance $d$ between a bushing and an end face of the lower mold is too small to accommodate a lever 104, the various rows of levers 104 for plungers 82 which are equally situated with respect to the cover cavities 68 are so disposed in the grooves 100 that none of them is located in a groove 100 within the distance $d$ from the adjacent end face 138 or 140 of the lower mold. Such alternate pivotal mounting of the various rows of levers 104 (see also Fig. 6) necessitates their connection through the bars 112 to diametrically opposite crank portions of the crankshaft 120, since it is imperative that all plungers 82 be moved in unison and in the same direction. The coordination between the crankshaft 120 and the levers 104 is such that approximately 90° rotation of the crank arm 136 results in movement of the plungers 82 from the uppermost position in Fig. 3 to a lowermost position in which the stems 84 of the plungers are flush with the bottom surfaces 142 of the annular recesses 81. Of course, each pair 60, 62 of molds is provided with a crank shaft 120 and actuating crank arm 136 for reciprocating the plungers in both lower molds 66 of the two pairs.

As best shown in Figs. 2 and 8, the bevel gears 88 of each row of cores 72 are in permanent mesh with other bevel gears 150 which are mounted on shafts 152, rotatably mounted in end plates 154 on the lower molds 66. As more particularly shown in Figs. 1 and 2, one end of the shafts 152 of each pair of molds carries a bevel gear 156 which is in mesh with a larger bevel gear 158, mounted on a shaft 160 which is journaled in suitable bearing brackets 162 on the carrier 26 and ram 30, respectively. Both shafts 160 carry furthermore gears 164 which are in mesh with larger gears 166, mounted on suitably journaled stub shafts 168 on the carrier 26 and ram 30, respectively. Also mounted on the stub shafts 168 are other gears 170 which mesh with racks 172 and 173, respectively, both racks being slidably mounted in a dove-tail guide 174 which extends from the main cylinder 20 to the head 24 and is secured to both as best shown in Fig. 1.

During movement of the ram 30 and carrier 26 from the position shown in Fig. 1 to that shown in Fig. 9 in which the molds are closed, the racks 172, 173 travel with the ram and carrier since the static friction in the drive from the gears 170 to the threaded cores 72 considerably exceeds the static friction between the racks and their guide 174. Thus during closing of the molds, the racks 172, 173 will move together with the ram 30 and carrier 26 until they engage stops 176 and 177, respectively, which are provided by the guide 174. The racks 172 and 173 engage their respective stops 176 and 177 prior to the closing of the molds, wherefore the gears 170 on the ascending ram and carrier would be rotated by the stopped racks 172, 173 and cause rotation of the cores 72, were it not for the fact that a ratchet mechanism is provided in each of the bevel gears 158 which is so operative as to prevent rotation of the cores 72 when the molds are being closed. Rotation of the cores 72 during closing of the molds would result in dislocation of the overlying strips of rubber which have been positioned longitudinally of the cover cavities 68—69. These ratchet mechanisms are alike for each bevel gear 158 and one of these mechanisms is shown in detail in Figs. 2 and 17. It appears from these figures that a hub 178 of each bevel gear 158 is keyed to the shaft 160 of each pair of molds and that the bevel gear 158 is journaled on said hub. Endwise movement of the bevel gear 158 on shaft 160 is prevented by a collar 180 and a ratchet disc 182, both being secured to the hub 178. The bevel gear 158 is provided with an annular recess 184 in which two diametrically opposite pawls 186 are pivoted at 188. Suitably tensioned springs 190 normally force the pawls 186 into engagement with the ratchet disc 182. The ratchet disc 182 and the pawls 186 are so associated that the driving ratchet disc rotates idly past the pawls in counterclockwise direction as viewed in Fig. 17 when the molds are closed. The cores 72 are thus prevented from rotating while the molds are being closed.

Reference is now had to Figs. 9 to 13 inclusive, which illustrate progressive stages in the opening of the molds. Fig. 9 shows the molds in closed position. During the slight retraction of the ram 30 from the position shown in Fig. 9 to that shown in Fig. 10, the upper rack 173 descends with the carrier 26 until said rack engages the stop 176. The cores 72 of the upper pair 60 of molds are, therefore, not rotated during such retraction. The upper mold 64 of said pair is now appreciably retracted from its companion mold 66 and from the molded covers therein which stick to said companion mold due to their threaded engagement with the cores 72. Unscrewing of the molded covers from the companion mold 66 may therefore safely start when said mold arrives in the position shown in Fig. 10. Continued descent of the ram 30 from the position in Fig. 10 causes gear 170 of said companion mold 66 to be rotated by the stopped rack 173 in a direction in which the cores 72 are rotated to unscrew from the filler holes of the molded covers in said companion mold 66, substantially as illustrated in Fig. 4. The upper pair 60 of molds separate until the carrier 26 reaches its lowermost position in Figs. 1 and 11, at which time the cores 72 in said companion mold 66 are just unscrewed from the molded covers. This is accomplished by selection of proper ratios between the various gears which transmit the rotary motion of the gear 170 to the cores 72. The molded covers have a tendency to stick in the corners of their mold cavities, therefore it is imperative that the covers are uniformly ejected from the companion mold 66 at substantially the rate with which the covers and cores 72 separate when the latter are unscrewed from the covers in order to prevent the core from functioning as an ejector which would strip the molded threads and cause the covers to become buckled. This is done by the operator who manipulates the earlier described crank arm 136 on the upper mold 66 while the cores 72 unscrew from the covers, i. e. during separation of the upper pair 60 of molds from the position in Fig. 10 to that in Fig. 11. The operator first withdraws the plunger stems 84 almost completely from the bushings substantially when the molds are open to the extent illustrated in Fig. 10. As soon as the cores 72 start to unscrew from the molded covers, the operator who becomes aware of this fact by the growing gap between the separating molds imparts short and rapid oscillations to the crank arm 136, shifting the range of oscillations thereby gradually in the direction in which the reciprocating plunger stems 84 advance into the bushings. The operator knows by experience how fast he can advance the reciprocating stems 84 into the bushings so as to prevent the resistance offered by the bushings to the advancing stems 84 exceeding an amount which results in buckling of the covers and/or stripping of the threads in the covers. The stems 84 of the plungers 82 are slightly tapered to facilitate their repeated retraction in the bushings during ejection of the covers. The cover-ejecting friction, static and sliding, between the repeatedly advancing stems 84 and the bushings is not counteracted by the unscrewing cores as is the friction between the retracting stems 84 and the bushings. This explains why the repeated reciprocations of the stems 84 cause gradual ejection of the molded covers from the mold. The bushings which are made of lead to resist acid become heated during the vulcanization of the covers and therefore shrink during the opening of the molds. The amount of shrinkage of the bushings is, however, practically negligible and does not interfere with the ejection of the covers from their cavities in the aforementioned manner. Comparatively short and rapidly repeated reciprocations will never lead to such ramming of the stems 84 into the bushings that the stems will either stick to the bushings or that such a force has to be exerted which might cause buckling of the covers. Furthermore, withdrawal of the stems 84 from the bushings is facilitated by slightly tapering these stems. To further facilitate the removal of the molded covers from their cavities it is preferable to mount the cores 72 as well as the plungers 82 in that mold from which removal of the molded covers takes the least amount of ejecting force. It will be noticed from Fig. 3 that in the absence of the threaded cores 72 and the plunger 82, the molded covers would stick to the upper mold 64 upon separation of both molds, since the cavities of the upper mold are more irregular than the comparatively smooth cavities of the lower companion mold.

Continued descent of the ram 30 from the position in Fig. 11 to the lowermost position in Figs. 1 and 13 results in opening of the lower pair 62 of molds. After the lower pair of molds becomes separated to the extent shown in Fig. 12, the cores 72 start to unscrew whereupon the operator manipulates the crank arm 136 of the lower pair of molds for gradual ejection of the covers in the same manner as previously described with respect to the upper pair 60 of molds. More particularly, the rack 172 engages a stop 200 on the guide 174 after separation of the lower pair of molds 60 to the extent shown in Fig. 12. Thus, by comparing Figs. 10 and 12, it can be understood that the cores in both pairs of molds start to unscrew after the same separation between the cooperating molds thereof.

It is of course, imperative for a successful operation of the cores that the gears 170 are in permanent mesh with the racks 172 and 173, respectively. Consequently, rack 172 has to be in mesh with its gear 170 in any of the illustrated positions of the lower mold 66 of the lower pair in Figs. 9 to 13, inclusive. It is a further requirement that the rack moves with said lower mold during movement from the position shown in Fig. 9 to that shown in Fig. 12, and vice versa, so as to prevent premature rotation of the cores in said lower mold while the pair 62 of molds is still closed. It is also a requirement that the rack 172 is stationary during descent of said lower mold from the position in Fig. 12 to that in Fig. 13 so as properly to unscrew the cores 72 from the covers. All these requirements necessitate the short rack 172 illustrated in the drawings. To prevent descent of this rack 172 under its own gravity from the position in Fig. 10 into engagement with the stop 200 and thereby demesh from its gear 170, a hook 202 is secured to the ram 30 which is so positioned as to engage the rack 172 and carry it upward with the ram from the position shown in Fig. 12 in which rack 172 is equally as coordinated to its gear 170 as rack 173 is coordinated to its gear 170 in the position shown in Fig. 10. The hook 202 is furthermore so positioned as to be able to pass the stop 200.

It is obvious from the foregoing that the unscrewing of the cores from the molded covers in both pairs of molds is responsive to the opening of the molds and that both pairs of molds are closed and opened by a single ram.

This invention is not limited to the combination between the rotary threaded cores and the cover ejecting means. Emphasis is laid on certain advantages which are secured by the cover ejecting means in the absence of any threaded cores. In molding battery covers without the threaded filler hole, for instance, the described cover ejecting means accomplishes three important functions, to wit, reinforcing the molded-in bushings against collapse under the molding pressure, ejecting a molded cover from the mold, and withdrawing the ejecting means (stems 84 of plungers 82) from the molded-in bushings as the cover is gradually ejected from the mold. It can be understood that upon short reciprocations of the plungers 82, the molded covers will be gradually forced from the mold rather than into the mold, because the least resistance against movement of the covers by frictional driving engagement with the reciprocating plunger stems 84 is offered in the direction in which the covers leave the mold. The slightly tapered surfaces of any mold, designed to facilitate removal of a molded article therefrom are a contributory factor in the successful operation of the above applied ejecting plungers 82, in that the return of a partly ejected cover into the mold meets with an increasing binding force on the tapered cavity walls of the mold which is not overcome by the friction between the molded-in bushings and the receding plungers 82.

While the embodiment of the present invention as herein disclosed, constitutes a preferred form, it is to be understood that other forms might be adopted, all coming within the scope of the claims which follow.

What is claimed is as follows:

1. In a molding press, the combination of cooperating molds defining a cavity; a threaded core rotatably mounted in one of the molds; and means to assist in the ejection of a molded article from said one mold as the core is rotated to unscrew from the threaded hole in the article.

2. In a molding press, the combination of cooperating molds defining a cavity; a threaded core rotatably mounted in one of the molds; means responsive to opening of the molds for rotating the core to unscrew from the threaded hole of a molded article; and means to assist in the ejection of the molded article from said one mold as the core unscrews from the article.

3 In a molding press, the combination of cooperating molds defining a cavity; a threaded core rotatably mounted in one of the molds; means for rotating the core upon separation of the molds; and a pin reciprocable in said one mold and into the cavity and adapted to fit into a bushing in the cavity during molding and to assist in the ejection of the molded article from said one mold while the core is rotating, the pin being gradually withdrawn from the molded-in bushing by short reciprocations; and means for reciprocating the pin.

4. In a molding press, the combination of cooperating molds defining a cavity; a threaded core rotatably mounted in one of the molds and projecting into the cavity; means responsive to opening of the molds for rotating the core to unscrew from the threaded hole of a molded article; and a pin reciprocable in said one mold and into the cavity and adapted to fit into a bushing in the cavity during molding and to assist in the ejection of the molded article from said one mold as the pin is gradually withdrawn from the molded-in bushing by short reciprocations.

5. In a molding press, the combination of aligned pairs of cooperating molds defining cavities, one mold of one pair being stationary and all other molds being movable; a single ram for opening and closing the pairs of molds successively; threaded cores rotatably mounted in the cavities of one mold of each pair; means for each pair cf molds and responsive to the opening thereof for rotating the cores to unscrew from the threaded holes of the molded articles; and manually operable means for each pair of molds to assist in the ejection of the molded articles therefrom.

6. In a molding press, the combination of aligned pairs of cooperating molds defining cavities, one mold of one pair being stationary and all other molds being movable; a single ram for opening all pairs of molds successively; threaded cores rotatably mounted in the cavities of one mold of each pair; pins reciprocable in said one mold of each pair and into the cavities thereof and adapted to fit into bushings in said cavities during molding and to assist in the ejection of the molded articles from the molds as the pins are gradually withdrawn from the molded-in bushings by short reciprocations; means for each pair of molds and responsive to opening to the molds thereof for rotating the cores to unscrew from the threaded holes of the molded articles; and manually operable means for each pair of molds to reciprocate the pins thereof simultaneously and in the same direction.

7. In a molding press, the combination of separable cooperating molds defining a cavity; a threaded core rotatably mounted in one of the molds; and means responsive to opening of the molds for rotating the core, said means including a gear on said one mold and a meshing slidable rack, and mechanism to cause relative movement between gear and rack while the molds open.

8. In a molding press, the combination of separable cooperating molds defining a cavity; a threaded core rotatably mounted in a movable mold; and means responsive to opening of the molds for rotating the core, said means including a gear on said movable mold, a slidable rack in mesh with said gear, and a stop for the rack.

9. In a molding press, the combination of separable cooperating molds defining a cavity; a threaded core rotatably mounted in a movable mold; and means responsive to movement of said movable mold relative to the other mold for rotating the core, said means including a train of meshing gears on said movable mold and in driving connection with the core, a slidable rack in mesh with one of said gears, two stops to be engaged by the rack upon movement in either direction, and an element in the train of gears to transmit rotation in one direction only.

10. In a molding press, the combination of two aligned pairs of cooperating molds defining cavities, one mold of the first pair being stationary and all other molds being movable; a single ram for opening and closing both pairs of molds successively; threaded cores rotatably mounted in one movable mold of each pair; and means responsive to opening of each pair of molds for rotating the cores thereof, said means including a train of meshing gears on each of the core carrying molds and in driving connection with the cores, two slidable racks each meshing with a gear of a train, and mechanisms each causing relative movement between the rack and meshing gear of a pair of molds while the same opens.

11. In a molding press, the combination of two aligned pairs of cooperating molds defining cavities, one mold of the first pair being stationary and all other molds being movable; a single ram for opening and closing both pairs of molds successively; threaded cores rotatably mounted in one movable mold of each pair; and means responsive to opening of each pair of molds for rotating the cores thereof, said means including a train of meshing gears on each of the core carrying molds and in driving connection with the cores, two slidable racks each meshing with a gear of a train, stops so located as to be engaged by the racks during relative movement between the molds of their respective pair only, and an element engaging the rack of the second pair of molds and moving it with said pair during the closing of the first pair of molds so as to prevent demeshing of said rack from its gear.

12. In a molding press, the combination of two aligned pairs of cooperating molds defining cavities, one mold of the first pair being stationary and all other molds being movable; a single ram for opening and closing both pairs of molds successively; threaded cores rotatably mounted in one movable mold of each pair; and means responsive to opening of each pair of molds for rotating the cores thereof, said means including a train of meshing gears on each of the core carrying molds and in driving connection with the cores, two slidable racks each meshing with a gear of a train, stops so located as to be engaged by the racks during relative movement between the molds of their respective pair only, and an element in each train of gears to transmit rotation in one direction only.

13. In a molding press, the combination of two aligned pairs of cooperating molds defining cavities, one mold of the first pair being stationary and all other molds being movable; a single ram for opening and closing both pairs of molds successively; threaded cores rotatably mounted in one movable mold of each pair; and means responsive to opening of each pair of molds for rotating the cores thereof, said means including a train of meshing gears on each of the core carrying molds and in driving connection with the cores, two slidable racks each meshing with a gear of a train, stops so located as to be engaged by the racks during relative movement between the molds of their respective pair only, an element in each train of gears to transmit rotation in one direction only, and another element engaging the rack of the second pair of molds and moving it with said pair during the closing of the first pair of molds so as to prevent demeshing of said rack from its gear.

14. In a molding press, the combination of a movable and cooperating stationary mold; a threaded core rotatably mounted in the movable mold; meshing gears on the movable mold and in driving connection with the core; a rack slidable in the direction of movement of the movable mold and in mesh with one of the gears; and two stops to be engaged by the rack upon movement in either direction, the stops being separated a distance slightly less than the preassigned opening and closing stroke of the movable mold, and the ratio between the gears being such that the core unscrews from the threaded hole of a molded article toward the end of an opening stroke of the movable mold.

15. In a molding press, the combination of two aligned pairs of cooperating molds defining cavities, one mold of the first pair being stationary and all other molds being movable; a single ram for opening and closing both pairs of molds successively; threaded cores rotatably mounted in one movable mold of each pair; and means responsive to opening of each pair of molds for rotating the cores thereof, said means including a train of meshing gears on each of the core carrying molds and in driving connection with the cores, two slidable racks each meshing with a gear of a train, and mechanisms each causing relative movement between the rack and meshing gear of a pair of molds while the same opens; and separate manually operable means for each pair of molds to assist in the ejection of the molded articles therefrom as the cores unscrew from the articles.

16. In a device as described the combination of a first mold structure having a cavity, an externally threaded insert located in the cavity and having a stem extending from one side of the insert, there being an interengagement between a portion of the cavity and the insert to restrain movement of the insert and the forcing of flash or rind longitudinally of the stem, a male mold section operative with the first mold section and the insert to form an article having internal threads complementary to those of the insert, the male mold section being removable after the forming of the article, means to retain the stem and the threaded insert together with the first mold structure from relative longitudinal movement in all procedures of the operation and means to rotate the stem and hence the threaded insert to unthread the article and disengage said article from the cavity of the first mold section and from the threaded insert.

17. In an apparatus for forming molded articles, the combination of a first mold member having a plurality of aligned mold cavities, a plurality of stems one of which extends vertically upwardly in the center of each mold cavity, each stem having a threaded male insert as its upper end of larger diameter than the stem and each insert being seated against the bottom of its associated mold cavity to thereby prevent formation of flash or rind longitudinally of the stem, means to prevent longitudinal movement between each stem and said first mold member in all of the operations of the apparatus, a complementary top or male mold member adapted to cooperate with said first mold member to form a plurality of molded articles at one operation of the apparatus and to form threaded openings surrounding said inserts, and means for simultaneously rotating said inserts, said top or male mold being separable from its cooperating mold member to permit removal of the molded articles upon rotation of said inserts.

18. In a molding press, the combination of cooperating molds defining a cavity and separable to permit removal of the molded article, a core rotatably mounted in one of the molds and having threads thereon to engage the molded article, means responsive to the separation of the molds for rotating the core to move the molded article away from the surface of the mold in which said core is mounted, a plurality of devices located in said mold on opposite sides of the core and engaging the molded article, and means for operating said devices during the rotation of the core in order to aid in ejecting the molded article from the mold cavity.

19. In a molding press, the combination of cooperating molds defining a cavity and separable to permit removal of the molded article, a core rotatably mounted in one of the molds and having threads thereon to engage the molded article, means responsive to the separation of the molds for rotating the core to move the molded article away from the surface of the mold in which said core is mounted, a pair of reciprocating pins located in said mold on opposite sides of said core and engaging said molded article, and means for reciprocating said pins during the rotation of the core in order to aid in ejecting the molded article from the mold cavity.

20. In a molding press, the combination of cooperating mold members defining a cavity and separable to permit removal of a molded article, said cavity being adapted to receive a bushing about which the molded article is formed, rotatable means for withdrawing the molded article from the mold, a pin mounted for reciprocatory movement into and out of the bushing during the withdrawal of the molded article from the mold cavity in order to assist in the ejection of said molded article, and manually operable means for reciprocating the pin in said bushing as the molded article is withdrawn and for withdrawing the pin from said bushing.

21. In a molding press, the combination of cooperating mold members defining a cavity and separable to permit removal of a molded article, said cavity being adapted to receive a bushing about which the molded article is formed, rotatable means for withdrawing the molded article from the mold, a pin mounted for reciprocatory movement into and out of the bushing during the withdrawal of the molded article from the mold cavity in order to assist in the ejection of said molded article, and means operable simultaneously with said rotatable means for reciprocating the pin in said bushing as the molded article is withdrawn and for withdrawing the pin from said bushing.

22. In a molding press, the combination of cooperating mold members defining a cavity and separable to permit removal of a molded article, said cavity being adapted to receive a bushing about which the molded article is formed, rotatable means for withdrawing the molded article from the mold, a pin mounted for reciprocatory movement into and out of the bushing during the withdrawal of the molded article from the mold cavity in order to assist in the ejection of said molded article, and means for repeatedly reciprocating the pin into and out of said bushing during the operation of said rotatable means in order to assist in the withdrawal of the molded article from the mold cavity.

23. In a molding press, the combination of cooperating molds defining a cavity which is adapted to receive a plurality of bushings, a threaded core rotatably mounted in one of the molds and projecting into the cavity so that the molded article is adapted to be formed about said core and bushings; means for rotating the core upon separation of the molds in order to eject the molded article, a plurality of pins reciprocably mounted in one of said molds and adapted to project into said bushings during the molding operation, means for simultaneously reciprocating the pins in said bushings as the core is rotated to assist in the withdrawal of the molded article from the mold cavity, said last named means being effective to move all the pins in the same direction at one time.

RAY A. BRUNER.